J. P. JOHNSON.
DUST BLOWING ATTACHMENT FOR HANDSAWS.
APPLICATION FILED FEB. 19, 1919.
1,318,565.
Patented Oct. 14, 1919.
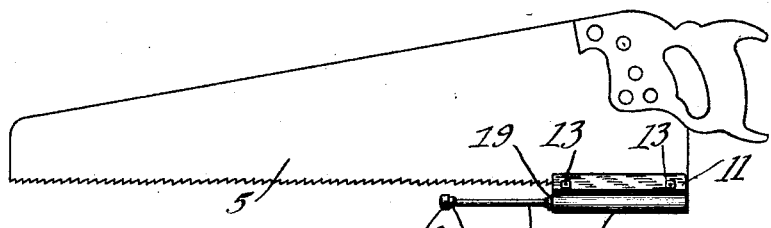
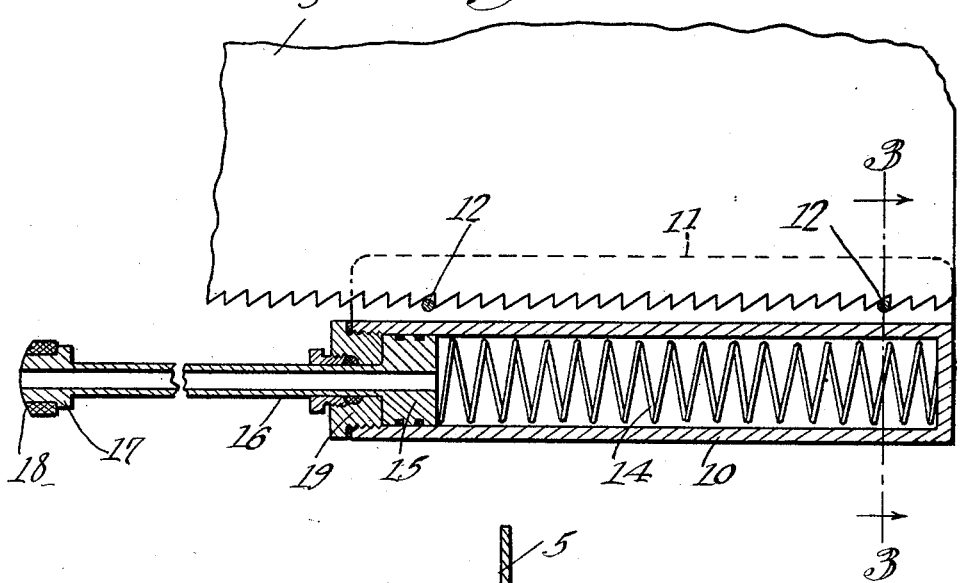
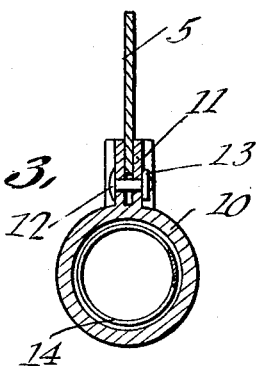
J. P. Johnson
Inventor

UNITED STATES PATENT OFFICE.

JAMES P. JOHNSON, OF SAVANNAH, GEORGIA.

DUST-BLOWING ATTACHMENT FOR HANDSAWS.

1,318,565. Specification of Letters Patent. Patented Oct. 14, 1919.

Application filed February 19, 1919. Serial No. 277,910.

*To all whom it may concern:*

Be it known that I, JAMES P. JOHNSON, a citizen of the United States, residing at Savannah, in the county of Chatham and State of Georgia, have invented a new and useful Dust-Blowing Attachment for Handsaws, of which the following is a specification.

My invention relates to dust blowing attachments for hand saws.

The principal object of the invention is to provide a dust blower for saws which will blow the saw dust from the guide line on the board so that the operator may see that the saw blade is cutting directly on the guide line.

Another object of the invention resides in the provision of a device of the above character which is detachable from the saw and which may be used in conjunction with any conventional hand saw.

A further object of the invention is to provide a blower attachment for hand saws which may be readily placed in operative position on the saw and which will not make the saw awkward to operate.

Still another object of the invention is to provide a blower attachment for hand saws which may be operated without withdrawing the saw blade from the board.

An additional object of the invention resides in the provision of a saw attachment for keeping the guide line always clean which is simple in construction, practical in use, consists of few parts that may be readily assembled and disassembled and which may be manufactured and sold at a comparatively small cost.

Other objects and advantages of the invention will become apparent from the following description and accompanying drawing wherein Figure 1 is a side elevation of a conventional saw and my invention applied thereto.

Fig. 2 is a fragmental view of the saw blade and showing my dust blowing attachment applied thereto on an enlarged scale; the device being shown in longitudinal cross section and Fig. 3 is a transverse sectional view taken on line 3—3 of Fig. 2.

The invention consists of combinations, arrangement of parts, details of construction, operations and general assemblage which will be hereinafter described and explicitly defined in the appended claims.

Referring to the drawing wherein like characters of reference indicate like parts in all of the views, the numeral 5 designates a saw of any conventional type.

My improved blower consists of a barrel 10 which is open at its forward end and has a pair of parallel longitudinal clamping plates 11 formed thereon. The plates are adapted to receive the toothed edge of the blade therebetween and are held in clamped engagement on the saw by bolts 12 which extend through these plates and have nuts 13 threaded thereon.

An expansible coil spring 14 is arranged in the barrel and bears against the hollow piston head 15 carried by the hollow piston rod 16 which is also mounted in the barrel.

A head 17 is formed on the other end of the piston upon which a rubber bumper 18 is arranged. A stuffing ring 19 is positioned in the open end of the barrel and encircles the piston rod 16.

In the use of my device the stroke of the saw blade is lengthened until the head 17 strikes the board being operated upon, upon the down stroke of the saw blade. At the completion of the down stroke of the saw the head 17 strikes the board being operated upon, thus the piston is forced inwardly in the cylinder 10 against the tension of the expansible spring 14 and expels air contained in the cylinder through the bore of the same and thence through the hollow piston rod and directed to the guide line and the dust blown therefrom.

While I have shown and described the preferred embodiment of the invention it is to be understood that the invention may be modified in many respects and that my limits of modification are only governed by the herewith appended claims.

What is claimed is:

1. In a blower for saws, a barrel adapted to be attached to the saw at its cutting edge and extending longitudinally of the same, a hollow piston reciprocable in the barrel and projecting outwardly and adapted to engage the board being operated upon, on the down stroke of the blade to compress air in the barrel and force the air from the barrel in a direction parallel to the movement of the saw.

2. The combination with a hand saw, of a barrel extending longitudinally of the cutting edge of the saw, parallel plates formed on the barrel adapted to receive the saw blade therebetween, fastenings extending transversely through the plates and accommodated in the spaces between the saw teeth, and a spring pressed hollow piston mounted in the cylinder, the piston projecting from the barrel and reciprocable longitudinally below the cutting edge and adapted to engage the board being operated on to compress air in the cylinder to be forced through the piston.

In testimony that I claim the foregoing as my own, I have hereto affixed my signature in the presence of two witnesses.

JAMES P. JOHNSON.

Witnesses:
 THEO. EULENBERG,
 C. C. WHITEHEAD.

Copies of this patent may be obtained for five cents each, by addressing the "Commissioner of Patents, Washington, D. C."